US 6,576,726 B1

(12) United States Patent
Rieger

(10) Patent No.: US 6,576,726 B1
(45) Date of Patent: Jun. 10, 2003

(54) CATALYST COMBINATION AND A PROCESS FOR PREPARING LINEAR, ISOTATIC POLYMERS

(76) Inventor: Bernhard Rieger, Johann-Stockar-Weg 50, 89075, Ulm (DE)

( * ) Notice: Subject to any disclaimer, the term of this patent is extended or adjusted under 35 U.S.C. 154(b) by 0 days.

(21) Appl. No.: 09/673,281

(22) PCT Filed: Apr. 8, 1999

(86) PCT No.: PCT/EP99/02378

§ 371 (c)(1),
(2), (4) Date: Oct. 19, 2000

(87) PCT Pub. No.: WO99/52950

PCT Pub. Date: Oct. 21, 1999

(30) Foreign Application Priority Data

Apr. 9, 1998 (DE) .......................... 198 16 154

(51) Int. Cl.⁷ .................................. C08F 4/64
(52) U.S. Cl. ...................... 526/160; 526/131; 526/133; 526/134; 526/165; 526/351; 526/943; 502/103; 502/152
(58) Field of Search ................ 502/102, 152; 526/131, 133, 134, 160, 165, 351, 943

(56) References Cited

U.S. PATENT DOCUMENTS 5,747,621 A  * 5/1998  Resconi et al.
5,840,947 A  * 11/1998  Kuber et al.

FOREIGN PATENT DOCUMENTS

| DE | 28 30 160 | 1/1979 |
| DE | 197 09 486 A1 | 9/1998 |
| EP | 0 582 194 A1 | 2/1994 |
| EP | 0 707 016 A1 | 4/1996 |
| EP | 0 747 406 A1 | 12/1996 |
| GB | 2 241 244 A | 8/1991 |
| WO | PCT/EP95/05016 | 7/1996 |
| WO | PCT/US98/22028 | 4/1999 |

OTHER PUBLICATIONS

Dietrich et al., "New Class of Thermoplastic Elastic Polypropenes Prepared with a High Activity 'Dual Side' Zirconocene Catalyst," *RAPRA Abstracts*, 36 (1) (Jan., 1999).

Dietrich et al., "Control of Stereoerror Formation with High-Activity 'Dual-Side' Zirconocene Catalysts: A Novel Strategy to Design the Properties of Thermoplastic Elastic Polypropenes," *J. Am. Chem. Soc.*, 121 (18), 4348–4355 (1999).

Rieger et al., "Novel Metallocene Catalyzed Polypropene Homo–and Brush–Copolymers: Control of New Morphologies and Beyond," *Polym. Mater. Sci. Eng.*, 80, 51–52 (1999).

Rieger, B. "Stereospecific Propene Polymerization with rac-[1,2-bis($\eta^5$-(9-fluorenyl))-1-phenylethane]zirconium dichloride/methylalumoxane," *Polymer Bulletin*, 32 (1), 41–46 (Jan. 1994).

Search Report for Application No. DE 198 16 154 A1 dated Oct. 21, 1999.

Search Report for Application No. PCT/EP99/02378 dated Sep. 17, 1999.

Keii et al. *Catalytic Defin Polymerization*, Tokyo: Kodanska Elsevier Pub., pp. 439–480, (1990).

* cited by examiner

*Primary Examiner*—Caixia Lu
(74) *Attorney, Agent, or Firm*—Leydig Voit & Mayer, Ltd.

(57) ABSTRACT

The invention concerns a metallocene catalyst composition for preparing linear isotactic polymers, wherein said catalyst composition contains a metal complex and an activator. The invention also concerns a process for preparing linear, isotactic polymers which have a structure of which the tacticity varies within the range of between 25 and 60% of [mmmm] pentad concentration, in which process a $C_2$ to $C_{20}$ olefin is polymerized in the presence of catalyst composition.

19 Claims, 4 Drawing Sheets

CATALYST COMBINATION AND A PROCESS FOR PREPARING LINEAR, ISOTATIC POLYMERS

FIELD OF THE INVENTION

The present invention relates to a new catalyst composition and a process for preparing linear, isotactic polymers, wherein the isotacticity of the linear polymers due to a statistic distribution of stereoscopic errors in the polymer chain, being within the range of from 25 to 60% of pentad concentration.

BACKGROUND OF THE INVENTION

For a long time, isotactic polymers have been of interest as plastic materials for manufacturing articles of relatively good deformation resistance, such as sheathings of household appliances. In general, such isotactic polymers with propylene as monomer are highly crystalline nature and, therefore, are relatively hard with little or no impact resistance such that they are useful only in applications in which hardness or low impact resistance is desirable.

Most recently, various attempts have been made, aiming at preparing polypropylene with elastic characteristics. EP 0 707 016 A1 specifies a catalyst composition and a process for preparing polyolefins. The catalysts specified in EP 0 707 016 A1 are, in substance, made up of a metallocene compound having an indene ring and a fluorene ring which are bridged via C, Si or Ge. In case of the metallocene compound, it is essential that, in the indene ring system, at least the residue denoted with $R^4$ not be hydrogen. When that residue $R^4$ is hydrogen, the effects will not be attained. The polymers specified in EP 0 707 016 A1 and prepared with metallocenes, especially the polypropylene prepared with those metallocenes, however, have shown unsatisfactory characteristics in regard of the elastic behavior.

BRIEF SUMMARY OF THE INVENTION

It is the object of the present invention to find a new catalyst and a process for making polymers from olefinically unsaturated compounds, which have not only thermoplastic characteristics, but also thermoplastic-elastic characteristics, thus making the polymers useful for many applications.

DETAILED DESCRIPTION OF THE INVENTION

Figure 1:
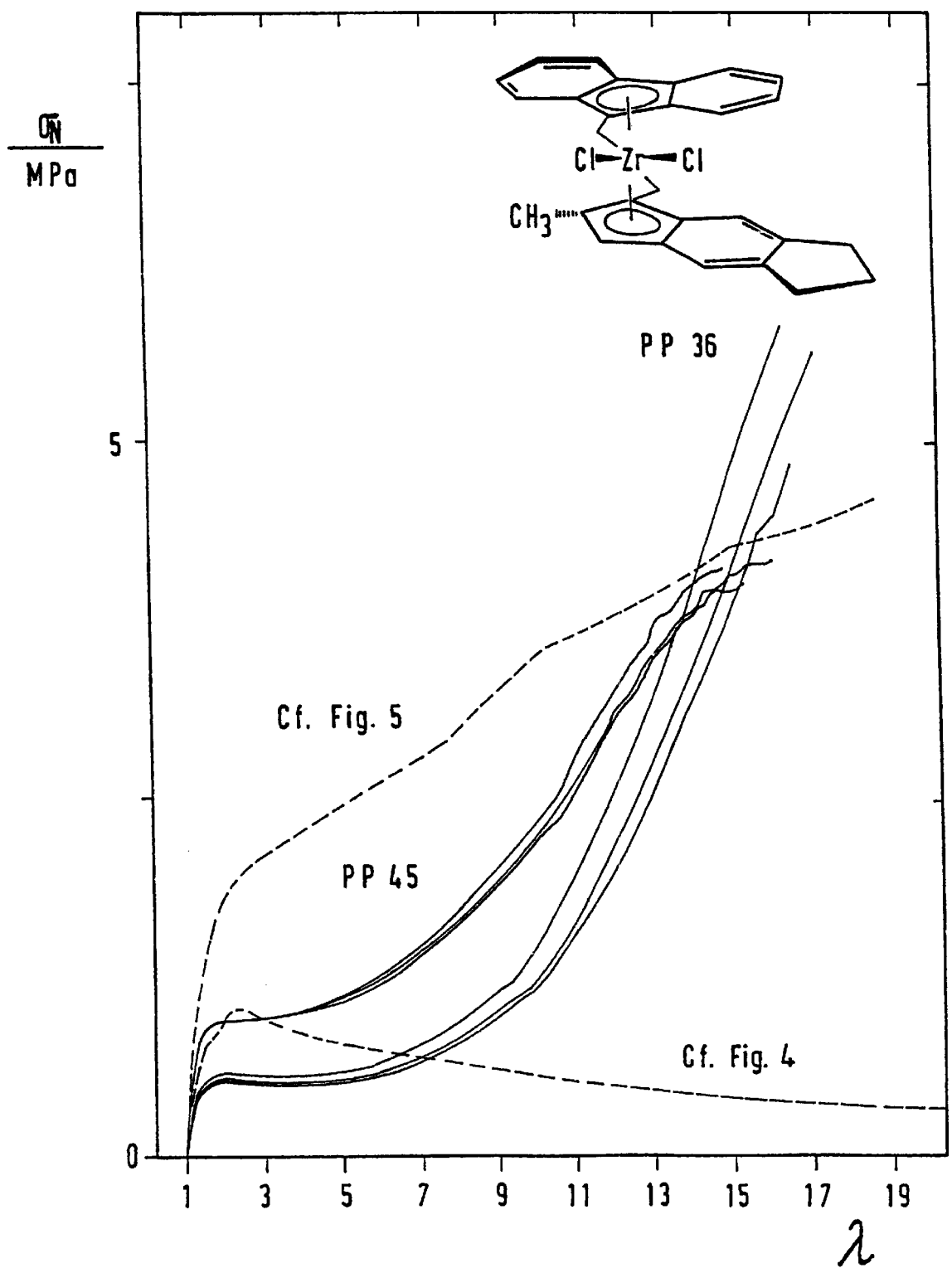
FIG. 1. illustrates tensile strength measurements on two polymers according to the invention, as compared to two polymers from EP 0 707 016 A1.
Figure 2:
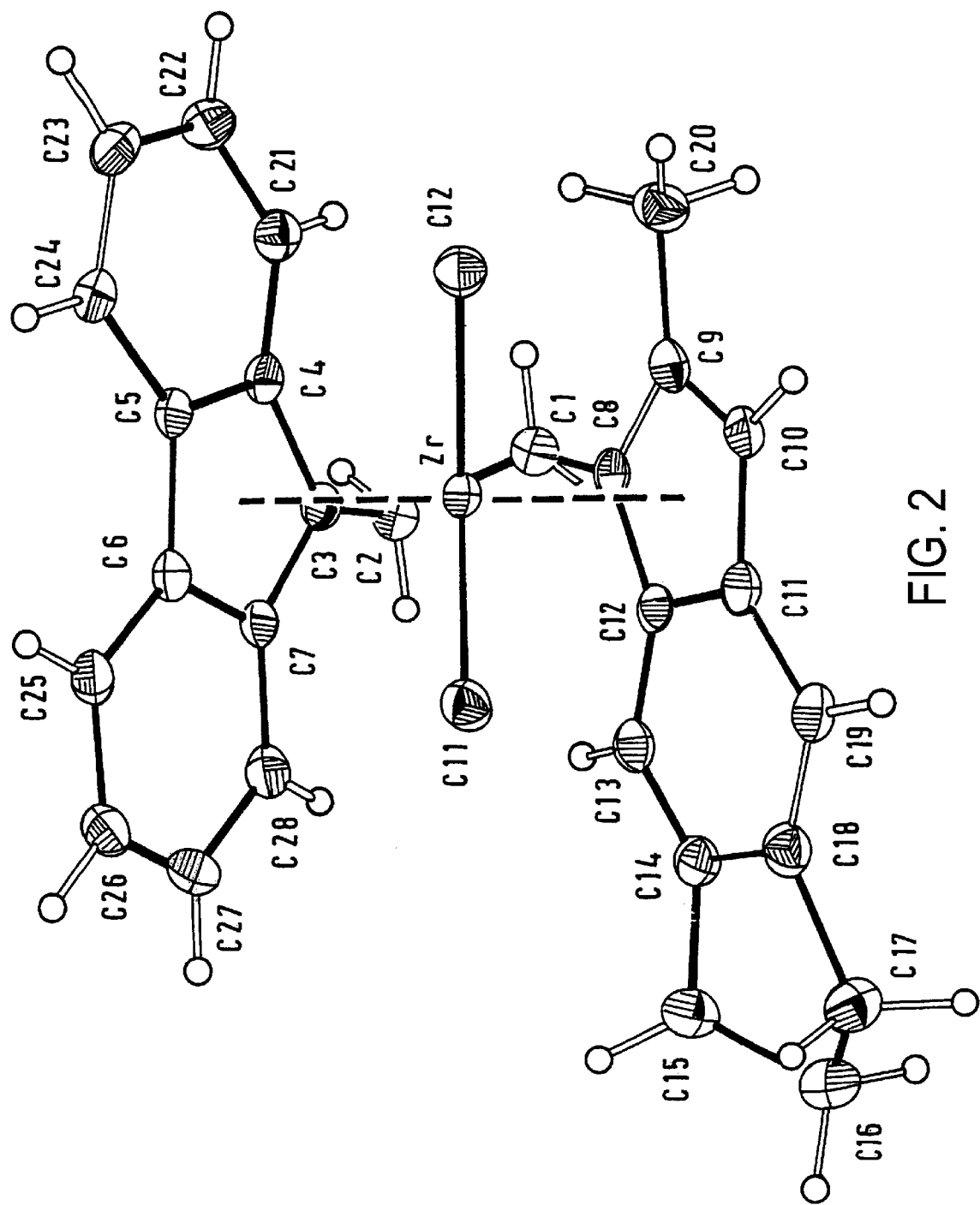
FIG. 2. illustrates an x-ray structure analysis of a metallocene complex according to the invention.
Figure 3:
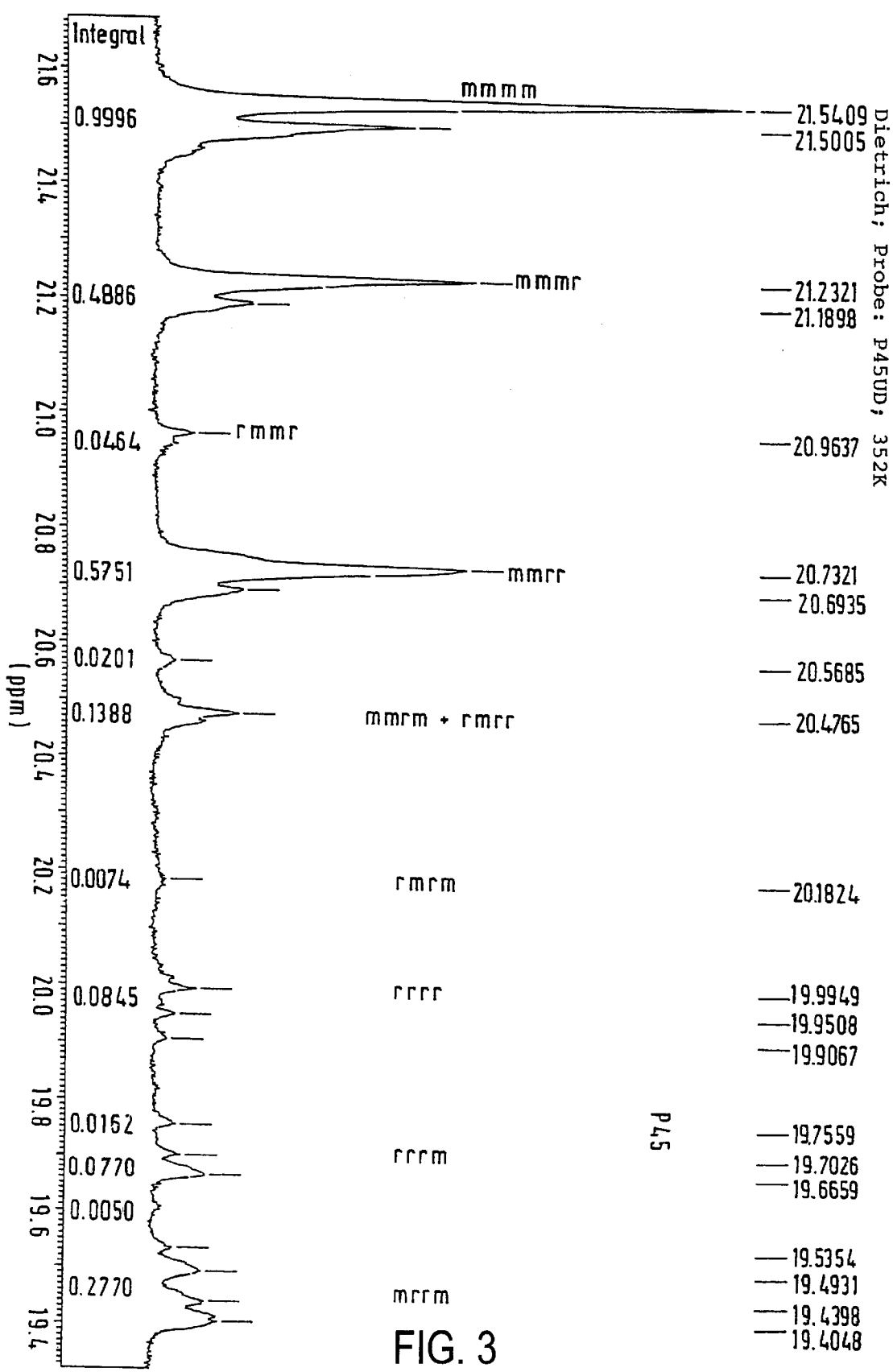
FIG. 3. illustrates a nuclear magnetic resonance (NMR) spectrum of a polymer according to the invention FIG. 4. illustrates a nuclear magnetic resonance (NMR) spectrum of another polymer according to the invention.

The invention relates to a new catalyst composition containing a metal complex and an activator. The metal complex is a metallocene compound, for example, a metallocene containing a metal selected from Group IVB of the Periodic Table. The metallocene compounds may be present as defined metal complexes mixed with activators. In general, the metals present in the metal complexes have a formally positive charge. Specifically, the metal can be titanium, zirconium, hafnium, vanadium, niobium, or tantalum. Preferably, the metal is substituted by a halogen or a $C_1$–$C_5$ alkyl, aryl or benzyl group.

The metallocene is defined by general Formula I:

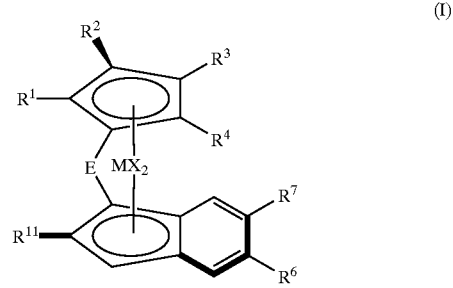

(I)

wherein $R^1$, $R^2$, $R^3$, $R^4$, $R^6$, and $R^7$ are a linear or branched $C^1$–$C_{10}$ alkyl, a $C_5$–$C_7$ cycloalkyl that, in its turn, may carry one or several $C_1$–$C_6$ alkyl residues as substituents, a $C_6$–$C_{18}$ is aryl, aryl alkyl or alkyl aryl, in which case $R^1$, $R^2$, $R^3$, $R^4$, and $R^6$, $R^7$, here again, may be partially or simultaneously integrated into $C_5$–$C_7$ cycloalkyl or aryl rings fused thereto.

In case of the metallocene compound according to general Formula I, it is essential that the number 7 indenyl carbon adjacent to the carbon substituted by residue $R^7$ and the number 4 indenyl carbon adjacent to the carbon substituted by residue $R^6$ are only substituted by hydrogen, thereby providing a catalyst that is especially advantageous for preparing isotactic elastomers according to the invention. In contrast, the metallocene complex according to EP 0 707 016 A1 does not have such limitations.

Suitable bridging structural units E are —$CH_2CH_2$—, —$CH_2CH_2CH_2$—, —$CH_2CH_2CH_2CH_2$—, —$CR^9R^{10}$—, —$SiR^9R^{10}$— or —$GeR^9R^{10}$—, wherein $R^9$ and $R^{10}$ are a $C_1$–$C_8$ alkyl, a $C_{4-7}$ cycloalkyl or aryl, and $R^9$ and $R^{10}$ are able to join together to form a ring structure.

A particularly preferred embodiment of the invention resides in that such a metallocene complex is used as reflected by general Formula VII.

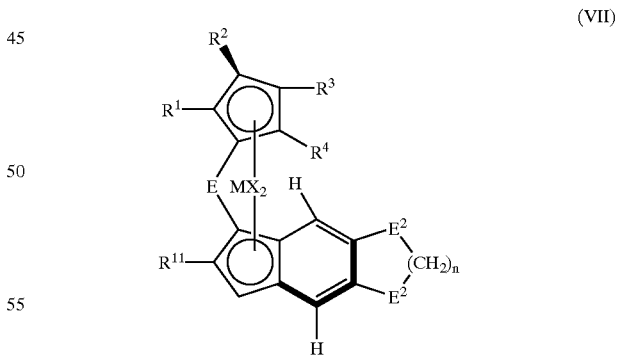

(VII)

wherein all the residues have the definitions indicated above. In contrast to the metallocene complex according to general Formula I, it is imperative that another ring is fused to the indene ring system. The additional fused ring is bridged via two $E^2$ groups, wherein $E^2$ is $CH_2$, oxygen, or sulfur, and n is 1 or 2.

It is furthermore provided in accordance with the invention, to additionally use at least one activator, apart from the metallocene compounds specified above. The invention, herewith, generally encompasses all the activators that have as yet become known in the state-of-the-art for metallocene compounds. Such activators have also been specified by EP 0 707 016 A1. As activator, at least one compound of general Formulas II to VI preferably is used. Accordingly, the activator may be an open-chain or cyclic alumoxane compound of general Formula II or III:

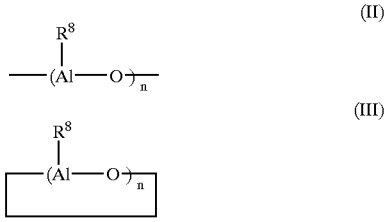

wherein $R^8$ is a $C_1$–$C_4$ alkyl group and n is a number between 5 and 30.

The catalyst composition according to the invention and optionally the above-specified compounds of general Formulas II and III can be used alone or in combination with the subsequent activators of general Formulas IV to VI:

wherein $R^9$ is a $C_1$–$C_4$ alkyl group or an aryl group.

It has proven to be especially favorable to employ the metallocene complex according to general Formula I and the activator according to general Formulas II to VI in such quantities that the atomic ratio between aluminum from the alumoxane or boron from the activator and the transition metal from the metallocene complex is within the range of from 1:1 to $10^6$:1.

Pressures of from 1 to 100 bars, preferably of from 3 to 20 bars and in particular of from 5 to 15 bars, have proven to be suitable reaction parameters for preparing the linear, thermoplastic, elastomeric olefin polymers. Favorable temperatures are within the range of from −50° C. to 200° C., preferably from 100 to 150° C. and more preferably from 20 to 50° C.

The polymerization reactions can be carried out in the gas phase, in suspension, and in supercritical monomers, and especially in solvents which are inert under the polymerization conditions. In particular the solution polymerization has proven to be superior for the present preparation process. Suitable inert solvents for that purpose are such solvents that do not contain any reactive groups in the molecule, i.e., aromatic solvents like benzene, toluene, xylene, ethyl benzene or alkanes such as propane, n-butane, i-butane, pentane, hexane, heptane or mixtures thereof The polymers according to the invention are particularly suited for the making of fibers, sheets, and molded bodies and are highly suited for such applications that make impact resistance a precondition. The polymers according to the invention can, furthermore, be utilized as blend components in plastic materials, especially in such impact resistant plastic materials.

The present invention will, hereinafter, be explained in more detail on the basis of several preparation examples of the catalysts and on the basis of polymerization examples.

EXAMPLES

Figure 4:
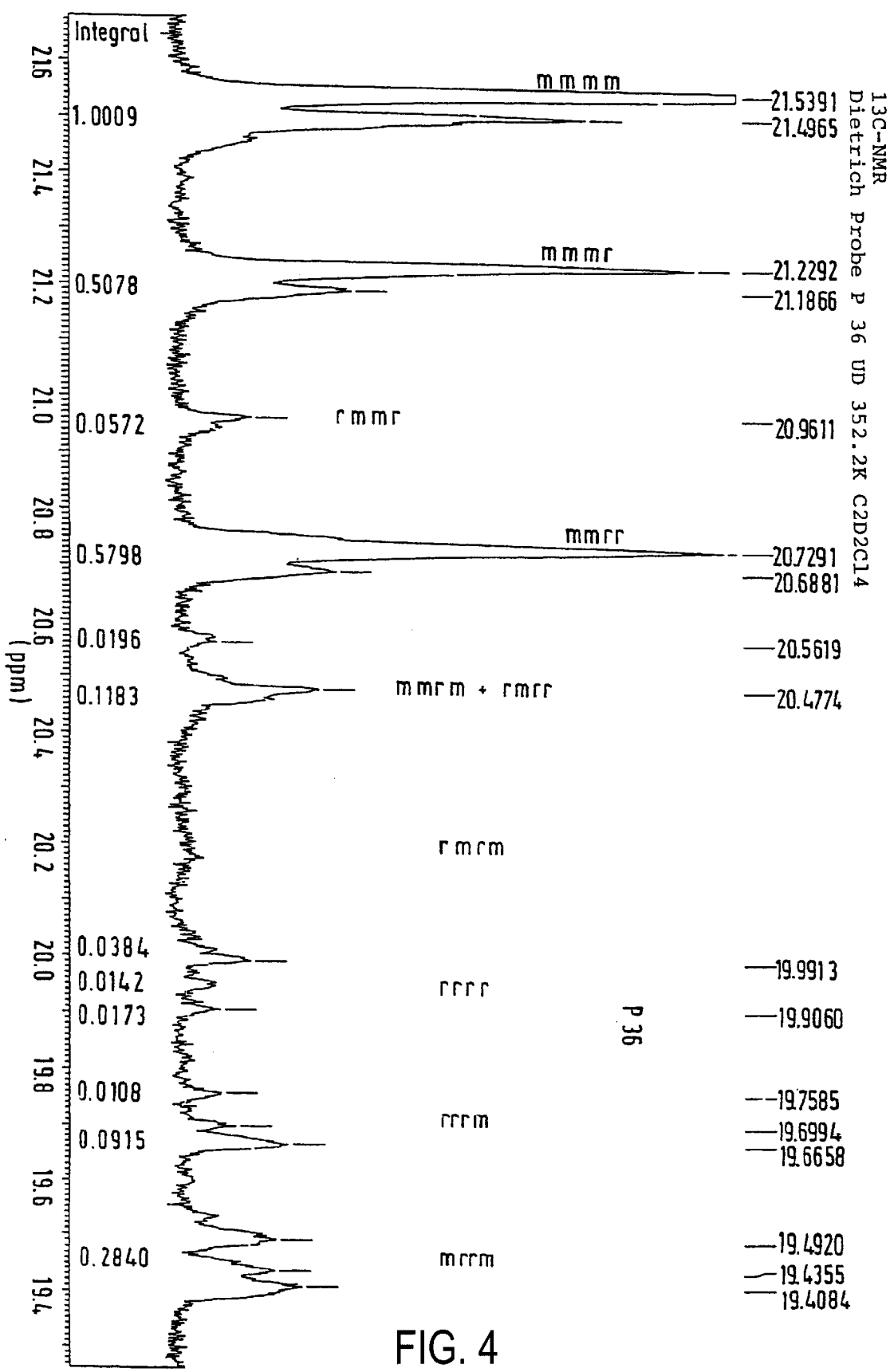

FIG. 1 illustrates the tensile-strength measurements of two selected examples from EP 0 707 016 A1, as compared to two polymers prepared in accordance with the invention. The remarks "Cf. FIG. 4" and "Cf. FIG. 5" in FIG. 1 refer to the corresponding examples from EP 0 707 016 A1. As can be drawn from a comparison of the comparative tensile-strength curves with the tensile-strength curves of the polymers (PP 36 and PP 45) prepared according to the invention, the polymers according to the invention show a distinctive, rubber-elastic plateau. Contrary thereto, the polymers according to EP 0 707 016 A1 present either a flow behavior (Cf. FIG. 4) or the polymer breaks in case of higher expenditures of force (Cf. FIG. 5). This comparison clearly illustrates the surprising characteristics of the polymers prepared according to the invention which have a distinctive, rubber-elastic behavior.

Catalyst Preparation

Obtaining of 5,6-cyclopenta-2-methyl-indane-1-one 40.4 mL of methacryl acid chloride (387.9 mmols) are, together with 62.06 g of anhydrous aluminium chloride (20 mol % in excess), incorporated into 250 mL of $CH_2Cl_2$, cooled down to −78° C., and slowly mixed with 50.0 mL of indane (45.84 g, 387.9 mmols). As the indane is added, the color changes from bright yellow to orange. The mixture is carefully quenched with diluted HCl*aq, washed with hydrous $K_2CO_3$ solution and water, and dried through $Na_2SO_4$.

Yield: 70.07 g (376.2 mmols) of oily product, 97.0% of the theory NMR (200 mcps, CDCl3 7.24 ppm): δ1.25 ppm d (J=6.9 cps) 3H methyl group, δ2.10 ppm m (J=3.7 to 7.6 cps) 2H aliphatic protons of the cycles, δ2.62 ppm m 2H aliphatic protons of the indanone ring, δ2.86 ppm m (J=11 to 14 cps) 4H aliphatic protons of the cycles, δ3.25 ppm m (J=7.0 cps) 1H aliphatic proton of the indanone system, δ7.21 and 7.51 ppm s 2H aromatic MS (GC-MS) m/z 186 (M+100%), (186, 251 mol-1).

Obtaining of 5,6-cyclopenta-2-methylindane-1-ole 70.07 g (376.2 mmols) of the 2-methyl-5,6-cyclopentylindane-1-one are, with 5 g of $LiAlH_4$, reduced in 200 mL of $Et_2O$ by letting the ketone drip (2 hrs) slowly towards an ice-cooled suspension of $LiAlH_4$. Agitating is effected all through the night and quenching with $H_2O$ is carried out, the color of the solution changing from lime green to bright yellow. Now 15 mL of HCl are added in concentrated manner and the emulsion is agitated for 1 h. The ethereal phase is separated, neutralized with 200 mL of $K_2CO_3$ solution, and three times washed with water. Thereafter, drying is effected through $Na_2SO_4$ and the solvent is completely removed. A crystalline mixture of the diastereomeric 1-indanoles is obtained. NMR (200 mcps, $CDCl_3$); δ1.13 ppm D 3H methyl group, δ1.76 ppm wide 1H OH group, δ2.05 ppm m 2H aliphatic protons of the cycles, δ2.15 to 2.71 ppm m 2H aliphatic protons of the indanole ring, δ2.87 ppm m 4H aliphatic protons of the cycles, δ3.08 ppm 1 H aliphatic proton of the indanole system, δ4.17 and 4.93 ppm d 2H with OH function on the indanole ring, δ7.08 and 7.23 ppm d 2H aromatic.

Yield: 69.62 g, 369.8 mmols, 98.3% of the theory MS (GC-MS) m/z 188 (M+100%), (188.267 g $mol^{-1}$).

Obtaining of 5,6-cyclopenta-2-methylindene 69.62 g (369.8 mmols) of the diastereomer mixture of the 2-methyl-5,6-cyclopentylindene-1-oles are dissolved in 500 mL of benzene; and then 3 to 5 g of p-TosOH are added and the emulsion is, for three quarters of an hour, boiled on the water separator under reflux. The organic phase is separated, neutralized with 200 mL of $K_2CO_3$ solution, and three times washed with water. Thereafter, drying is effected through $Na_2SO_4$ and the solvent is completely removed.

The product colorlessly crystallizes from n-pentane; yield: 57.67 g, 338.7 mmols corresponding to 91.6% of the theory MS (GC-MS) m/z 170 (M+100%), (170.225 g mol⁻

1). NMR (200 mcps, CDCl₃ 7.24 ppm): δ2.23 ppm m/s 5H methylene and 2-methyl group of the indene system, δ3.01 ppm t 4H methylene groups, δ3.32 ppm s 2H methylene group acids, δ6.51 ppm s 1H olefinic indene system, δ7.20 and 7.34 ppm s 2H aromatic, 13-NMR (200 mcps, CDCl₃): δ16.8 ppm methyl group, δ25.8 ppm methylene group of Cycle 5, δ32.66 and 32.72 ppm methylene groups of the Cycle, δ42.2 ppm methylene group of the indene system, δ127.1 ppm tertiary C-atom of the indene system, δ115.5 and 119.5 (each with H) ppm aromatic C-atoms, the same without H for 139.6, 141.7, 142.1, 144.4, and 145.0 ppm incl 4° olefinic C-atom of the indene system (cf. CH correlation and HH-COSY).

Obtaining of 1-(9-fluorenyl)-2-(1-(1-(5,6-cyclopenta-2-methyl)indenyl)ethane 3.89 g of 2-methyl-5,6-cyclopentylindene-1 (22.85 mmols) are, with 14.3 mL of n-BuLi, deprotonated in 150 mL of dioxane and then mixed with a solution of 25.13 mmols of 2-(9'-fluorenyl)ethyltrifluoromethane sulphonate in 100 mL of dioxane. Agitating is effected all through the night, heating up to 60° C. is carried out for half an hour and the solution is quenched with ca. 3 mL of H₂O. The dioxane is removed and the product is extracted with three times 200 mL of Et₂O. Without chromatographic processing, 6.49 g (17.9 mmols, 78.3% of the theory) of a colorless, crystalline product are obtained.

NMR (200 mcps, CDCl3, 7.24 ppm): δ1.89 ppm s 3H methyl group, δ1.41 ppm to 1.72 ppm m 4H aliphatic protons of the bridge, δ2.10 ppm pseudo-t 2H aliphatic protons of the cycle, δ2.90 ppm pseudo-t 4H aliphatic protons of the cycle, δ3.87 ppm t 1H aliphatic proton of the fluorine system, δ6.40 ppm s 1H indene proton, δ6.98 and 7.07 ppm aromatic protons of the indene system, δ7.31 to 7.77 ppm m 8H aromatic of the fluorine. MS (FD) m/z 362.5 (M+100%).

Obtaining of 1-(9-fluorenyl)-2-(5,6-cyclopenta-2-methyl)indenyl)ethane zirconocene dichloride 1.711 g of 1-[1'-(2'-methyl)-5',6'cyclopentylindenyl-2-(9'-fluorenyl)]ethane (4.72 mmols) are dissolved in 100 mL of toluene, mixed with 10 mL of dioxane, and deprotonated, at low temperature, with 5.9 mL of n-BuLi. Agitating is effected for ca. 1 hour and then the suspension is again cooled down to −78° C. Now 1.10 gm of ZrCl₄ is added. That suspension is agitated, at room temperature, for another 14 hours, in which case a fine red powder forms that can be crystallized after a separation of formed LiCl from toluene.

Yield: 2.148 g (4.11 mmols, 87.1% of the theory). NMR (500 mcps, C₂D₂Cl₄ 80° C.); δ2.00 ppm m 2H methylene group cyclopentane ring (J=6.8 to 7.5 cps), δ2.15 ppm s 3H methyl group, δ2.79 to 2.94 ppm m 4H methylene groups cyclopentane ring adjacent to the aromatic system (J=7.5 to 9.7 cps), δ4.05 ppm m (J=3.5 to 13.2 cps) 2H aliphatic protons of the bridge (in case of the fluorine), δ3.83 and 4.57 ppm m (J=4.2 to 10.0 cps) 1H aliphatic protons of the bridge (diastereotopic) at a time, δ6.05 ppm s 1H indene proton, δ7.03 to 7.85 ppm m 10H aromatic. MS (El) m/z 5, 22, 6 isotopic pattern corresponding to natural distribution.

EA CH-combustion analysis: calculated 64.35%; C, 4, 63%; H, Found: 64.08/63.89%; 4.53/4.63%.

Polymerization Example

All the polymerizations were carried out in 300 mL of toluene under the conditions indicated in Table 1.

The NMR data were measured by means of a Bruker AMX 500 device and evaluated on the basis of literature data.

TABLE 1

| Run No. | Catalyst | Amount # | Tp [° C.] | C3 [mol-1] | Yield [g] | tp [min] | Activity* | Tg [° C.] | Tm [° C.] | Mw | Mw/Mn |
|---|---|---|---|---|---|---|---|---|---|---|---|
| P36 | Flu-Et-IInd | 7.5 | 30 | 2.9 | 36.87 | 33 | 3080 | −5.9 | 50.2 | 171.000 | 1.96 |
| P45 | Flu-Et-IInd | 10 | 35 | 4.92 | 115.23 | 39 | 3603 | −7.5 | 51.7 | 95.700 | 1.74 |

| Run No. | Pentaden in % | mmmm | mmmr | mmrr | mmrr | mmm + rmrr | mrm | rrrr | rrrm | mrrm | Al/Zr |
|---|---|---|---|---|---|---|---|---|---|---|---|
| P36 | | 36.7 | 18.5 | 2.1 | 21.1 | 5.0 | 0.0 | 2.5 | 3.7 | 10.3 | 2000 |
| P45 | | 36.5 | 17.9 | 1.7 | 21.0 | 5.8 | 0.3 | 3.1 | 3.6 | 10.1 | 2000 |
| | # in μmol | | | *kg PP/mol[Zr]mol[C3]h | | | | | | | |

What is claimed is:

1. A catalyst composition for preparing linear isotactic polymers which have a structure of which the tacticity varies within the range of between 25 and 60% of [mmmm] pentad concentration, said catalyst composition containing a metal complex of general Formula I

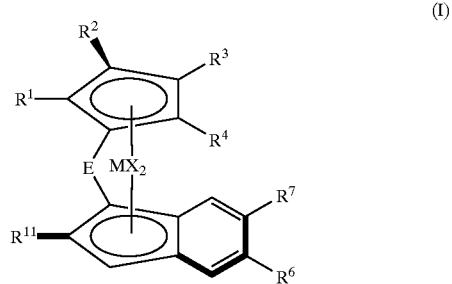

(I)

wherein the substituents have the following significations:

R¹–R⁷; linear or branched $C_1$ to $C_{10}$ alkyl, $C_5$ to $C_7$ cycloalkyl which, in its turn, can carry one or several $C_1$ to $C_6$ alkyl residues as substituent, $C_6$ to $C_{18}$ aryl or arylalkyl or alkylaryl, in which case $R^1/R^2$, $R^3/R^4$, $R^6/R^7$ can be partially or simultaneously integrated into $C_5$ to $C_7$ cycloalkyl or aryl rings fused thereto;

$R^{11}$ $C_1$ to $C_8$ alkyl, aryl, $C_1$ to $C_8$ oxyalkyl, $C_1$ to $C_8$ trialkylsiloxy;

E —CH₂CH₂—, —CH₂CH₂CH₂—, —CH₂CH₂CH₂CH₂—, —CR⁹R¹⁰—, —SiR⁹R¹⁰—, or GeR⁹R¹⁰—; wherein R⁹, R¹⁰ is a $C_1$ to $C_8$ alkyl, a $C_4$ to $C_7$ cycloalkyl or $C_4$ to $C_7$ aryl, in which case R⁹, R¹⁰ can be jointly with E, form a $C_4$ to $C_7$ cycloalkyl or $C_4$ to $C_7$ aryl;

M titanium, zirconium, hafnium, vanadium, niobium, tantalum;

X halogen or $C_1$ to $C_8$ alkyl, aryl, benzyl;
and an activator.

2. The catalyst composition of claim 1, wherein the activator is an open-chain or cyclic alumoxane compound of general Formula II or III:

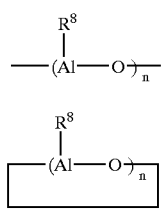

(II)

(III)

wherein $R^8$ is a $C_1$ to $C_4$ alkyl group and n is a number between 5 and 30, used alone or in combination with an activator of general Formula $B(C_6F_5)_3$ (IV), $R^9{}_3C[B(C_6F_5)_4]$ (V), or $[R^9{}_3NH][B(C_6F_5)_4]$ (VI), wherein $R^9$ is a $C_1$ to $C_4$ alkyl group or an aryl group.

3. A catalyst composition according to claim 1, wherein the metal complex according to general Formula I is a compound of general Formula VII

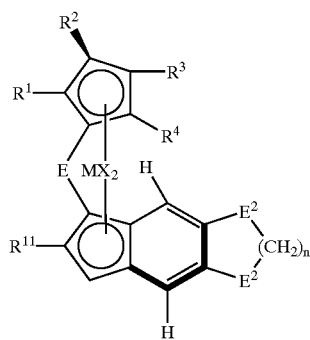

(VII)

wherein the residues E and $R^1$ to $R^{11}$ have the significations indicated in general Formula I, $E^2=CH_2$, O or S, and n=1 or 2.

4. The catalyst composition according to claim 1, wherein the metallocene complex of general Formula I and the activator according to general Formulas II to VI are utilised in such quantities that the atomic ratio between aluminum from the alumoxane and/or boron from the cationic activator, and the transition metal from the metallocene complex is within the range of from 1:1 to $10^6$:1.

5. A process for preparing linear, isotactic polymers which have a structure of which the tacticity varies within the range of between 25 and 60% of [mmmm] pentad concentration, in which process a $C_2$ to $C_{20}$ olefin are reacted with a catalyst composition containing a metal complex of general Formula I

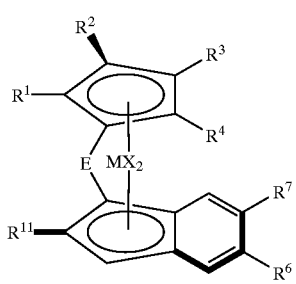

(I)

wherein the substituents have the following significations:
$R^1$–$R^7$ linear or branched $C_1$ to $C_{10}$ alkyl, $C_5$ to $C_7$ cycloalkyl which, in its turn, can carry one or several $C_1$ to $C_6$ alkyl residues as substituent, $C_6$ to $C_{18}$ aryl or arylalkyl or alkylaryl, in which case $R^1/R^2$, $R^3/R^4$, $R^6/R^7$ can be partially or simultaneously integrated into $C_5$ to $C_7$ cycloalkyl or aryl rings fused thereto;

$R^{11}$ $C_1$ to $C_8$ alkyl, aryl, $C_1$ to $C_8$ oxyalkyl, $C_1$ to $C_8$ trialkylsiloxy;

E $-CH_2CH_2-$, $-CH_2CH_2CH_2-$, $-CH_2CH_2CH_2CH_2-$, $-CR^9R^{10}-$, $-SiR^9R^{10}-$, or $-GeR^9R^{10}-$; wherein $R^9$, $R^{10}$ is a $C_1$ to $C_8$ alkyl, a $C_4$ to $C_7$ cycloalkyl or $C_4$ to $C_7$ aryl, in which case $R^9$, $R^{10}$ can jointly with E, form a $C_4$ to $C_7$ cycloalkyl or $C_4$ to $C_7$ aryl;

M titanium, zirconium, hafnium, vanadium, niobium, tantalum;

X halogen or $C_1$ to $C_8$ alkyl, benzyl;

and an activator.

6. A process according to claim 5, wherein the polymerization reaction is carried out in the gas phase, in suspension, in supercritical monomers, or in solvents that are inert under the polymerisation conditions.

7. A process according to claim 6, wherein the inert solvents are selected from the group consisting of benzene, toluene, xylene, ethyl benzene, and alkanes.

8. A process according to claim 5, wherein polymerization is carried out at pressures of from 1 to 100 bars and at temperatures of from −50 to 200° C.

9. The process according to claim 7, wherein the alkanes are selected from the group consisting of propane, n-butane, i-butane, pentane, hexane, heptane, and mixtures thereof.

10. The process according to claim 8, wherein polymerization is carried out at pressures of from 3 to 20 bars.

11. The process according to claim 10, wherein polymerization is carried out at pressures of from 5 to 15 bars.

12. The process according to claim 8, wherein the polymerization is carried out at temperatures of from 10 to 150° C.

13. The process according to claim 12, wherein the polymerization is carried out at temperatures of from 20 to 40° C.

14. A catalyst composition according to claim 2, wherein the metal complex according to general Formula I is a compound of general Formula VII:

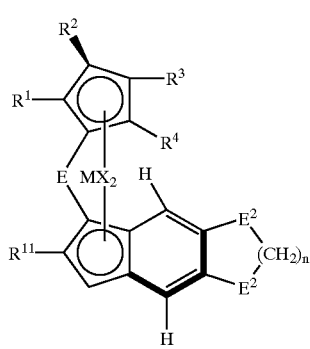

(VII)

wherein E, $R^1$ to $R^{11}$ have the significations indicated in general Formula I, $E^2=CH_2$, O or S, and n=1 or 2.

15. A catalyst composition according to claim 2, wherein the metallocene complex of general Formula I and the activator according to general Formulas II to VI are utilized in such quantities that the atomic ratio between aluminum from the alumoxane and/or boron from the activator and the transition metal from the metallocene complex is within the range of from 1:1 to $10^6$:1.

16. A catalyst composition according to claim 3, wherein the metallocene complex of general Formula I and the activator according to general Formulas II to VI are utilized in such quantities that the atomic ratio between aluminum from the alumoxane and/or boron from the activator and the transition metal from the metallocene complex is within the range of from 1:1 to $10^6$:1.

17. The process according to claim 5, wherein the activator is an open-chain or cyclic alumoxane compound of general Formula II or III:

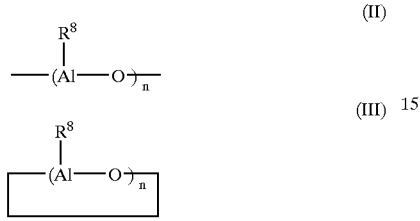

wherein $R^8$ is a $C_1$ to $C_4$ alkyl group and n is a number between 5 and 30, used alone or in combination with an activator of general Formula $B(C_6F_5)_3$ (IV), $R^9{}_3C[B(C_6F_5)_4]$ (V), or $[R^9{}_3NH][B(C_6F_5)_4]$ (VI), wherein $R^9$ is a $C_1$ to $C_4$ alkyl group or an aryl group.

18. The process according to claim 5, wherein the metal complex according to general Formula I is a compound of general Formula VII

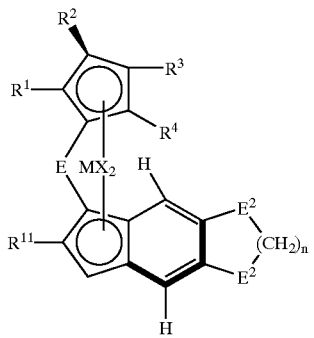

wherein E, $R^1$, $R^2$, $R^3$, $R^4$, and $R^{11}$ have the same definitions indicated in general Formula I, $E^2$=$CH_2$, O or S, and n=1 or 2.

19. The process according to claim 5, wherein the metallocene complex of general Formula I and the activator according to general Formulas II to VI are utilized in such quantities that the atomic ratio between aluminum from the alumoxane and/or boron from the activator, and the transition metal from the metallocene complex is within the range of from 1:1 to $10^6$:1.

* * * * *

UNITED STATES PATENT AND TRADEMARK OFFICE
CERTIFICATE OF CORRECTION

PATENT NO.    : 6,576,726 B1
DATED         : June 10, 2003
INVENTOR(S)   : Rieger It is certified that error appears in the above-identified patent and that said Letters Patent is hereby corrected as shown below:

Column 6,
Line 45, "wherein the substituents have the following significances: $R^1$-$R^7$" should read -- wherein: $R^1$, $R^2$, $R^3$, $R^4$, $R^6$, and $R^7$ --.
Line 57, "$C_4$ to $C_7$ aryl, in which case $R^9$, $R^{10}$ can be jointly with E, form a $C_4$ to $C_7$ cycloalkyl or $C_4$ to $C_7$ aryl;" should read -- $C_6$ to $C_7$ aryl, in which case $R^9$, $R^{10}$ can be joined together to form a ring structure; --

Column 7,
Line 35, "wherein the residues E and $R^1$ to $R^{11}$ have the significations" should read -- wherein E, $R^1$, $R^2$, $R^3$, $R^4$, and $R^{11}$ have the same definitions --
Line 64, "wherein th substituents have the following significations: "$R^1$–$R^2$" should read -- wherein: $R^1$, $R^2$, $R^3$, $R^4$, $R^6$, and $R^7$ --.

Column 8,
Line 11, "$C_4$ to $C_7$ aryl, in which case $R^9$, $R^{10}$ can be jointly with E, form a $C_4$ to $C_7$ cycloalkyl or $C_4$ to $C_7$ aryl;" should read -- $C_6$ to $C_7$ aryl, in which case $R^9$, $R^{10}$ can be joined together to form a ring structure; --
Line 20, "polymerisation" should read -- polymerization --.
Line 59, "wherein E and $R^1$ to $R^{11}$ have the significations" should read -- wherein E, $R^1$, $R^2$, $R^3$, $R^4$, and $R^{11}$ have the same definitions --.

Signed and Sealed this

Thirtieth Day of March, 2004

JON W. DUDAS
*Acting Director of the United States Patent and Trademark Office*